United States Patent [19]
Jang et al.

[11] Patent Number: 5,477,973
[45] Date of Patent: Dec. 26, 1995

[54] METHOD FOR MANUFACTURING A LIQUID CRYSTAL DISPLAY DEVICE

[75] Inventors: In-sik Jang; Nobuyuki Yamamura, both of Suwon, Rep. of Korea

[73] Assignee: Samsung Electronics Co., Ltd., Suwon, Rep. of Korea

[21] Appl. No.: 129,404

[22] Filed: Sep. 30, 1993

[30] Foreign Application Priority Data

Sep. 30, 1992 [KR] Rep. of Korea ............................ 17898
Nov. 14, 1992 [KR] Rep. of Korea ............................ 21450

[51] Int. Cl.$^6$ ................................................. C30B 33/00
[52] U.S. Cl. ................................................. 216/23; 216/39
[58] Field of Search ..................................... 156/644, 648, 156/650, 655, 656, 659.1, 667, 668; 216/23, 24, 39, 41

[56] References Cited

U.S. PATENT DOCUMENTS 4,452,826 6/1984 Shields et al. ........................... 156/648
4,654,117 3/1987 Aoki et al. ............................ 156/667 X
4,786,358 11/1988 Yamazaki et al. .................... 156/667 X Primary Examiner—William Powell
Attorney, Agent, or Firm—Cushman Darby & Cushman

[57] ABSTRACT

The present invention provides a method of forming a LCD in which the dissolution layer can be dissolved without the use of a strong etchant. The method according to the present invention uses alternating insulating layers and dissolution layers that are formed of different polymer resins. The polymer resin used for the insulting layer cannot be dissolved with a predetermined etchant, whereas the polymer resin used for the dissolution layer can be dissolved using the predetermined etchant. The predetermined etchant most advantageously used is water. A specific embodiment of the invention uses arabic rubber as the dissolution layer.

18 Claims, 5 Drawing Sheets

METHOD FOR MANUFACTURING A LIQUID CRYSTAL DISPLAY DEVICE

BACKGROUND OF THE INVENTION

The present invention relates to a method for manufacturing a liquid crystal display device which is used in an optical display, and more particularly to a method for forming an insulation layer to partition liquid crystal layers in a liquid crystal display having a multi-layer liquid crystal structure.

Currently utilized liquid crystal display devices, of an active matrix type use a simple X-Y matrix or thin film transistor (TFT) driving method. Both driving methods use a twisted nematic (TN) type or super twisted nematic (STN) type liquid crystal and a polarizing plate for controlling light. However, the polarizing plate in the liquid crystal display (LCD) intercepts more than 50% of the light. Accordingly, efficiency is lowered. For this reason, a background light source having a considerable intensity is required to obtain a picture image having a desired brightness. Thus, in a laptop word processors or computers which use a dry cell battery or an accumulative battery cell as a power supply source extended use is limited due to the excessive power consumption of the light source.

Also, in known LCDs, including the TN and STN LCD devices, since the liquid crystal is charged between two glass plates, a cell gap must be made within stringent range requirements to form a uniform picture image. Therefore, due to current technological limitations in the manufacturing of glass plates, enlarging LCD panels is hard to achieve.

Taking the above-described problems into consideration, in order to decrease the need for very precise cell gap adjustment, it has been known to eliminate the polarized plate to increase efficiency and instead use a single sheet of a base plate. Examples of LCD without a polarized plate include a cholesteric nematic transition (CNT) type which uses a phase transition effect and a dynamic scattering mode (DSM) type which was devised early in LCD development. The DSM type LCD exhibits slow response time and cannot be made thin. For those reasons it is no longer in common use.

Another example of an LCD not using a polarized plate to increase the efficiency of light is a polymer-dispersed liquid crystal display (PDLCD). However, since the PDLCD is made of a polymer material, more than half of whose volume is light-transmitting, the scattering of light is needed to obtain a clear contrast ratio. To attain these requirements, there is structural limitation that the thickness of the liquid crystal layer should be at least 20 m.

An LCD which adopts an electrical field effect type liquid crystal having a new structure in which the above conventional problems of the LCD are considerably improved, has been developed by a co-inventor, Nobuyuki Yamamura, and which bears U.S. patent application Ser. No. 08/058,712, was filed on May 10, 1993, and is expressly incorporated by reference herein. Improved LCD's have also been developed, which are described in Korean patent applications Nos. 15191, 15192, 15193 and 15194 filed in 1992.

SUMMARY OF THE INVENTION

The object of the present invention is to provide a method of forming a LCD in which the dissolution layer can be dissolved without the use of a strong etchant.

To solve the above object of the invention, the method according to the present invention uses alternating insulating layers and dissolution layers that are formed of different polymer resins. The polymer resin used for the insulting layer cannot be dissolved with a predetermined etchant, whereas the polymer resin used for the dissolution layer can be dissolved using the predetermined etchant. The predetermined etchant most advantageously used is water.

A specific embodiment of the invention uses arabic rubber as the dissolution layer.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE PREFERRED EMBODIMENT

Figure 1:
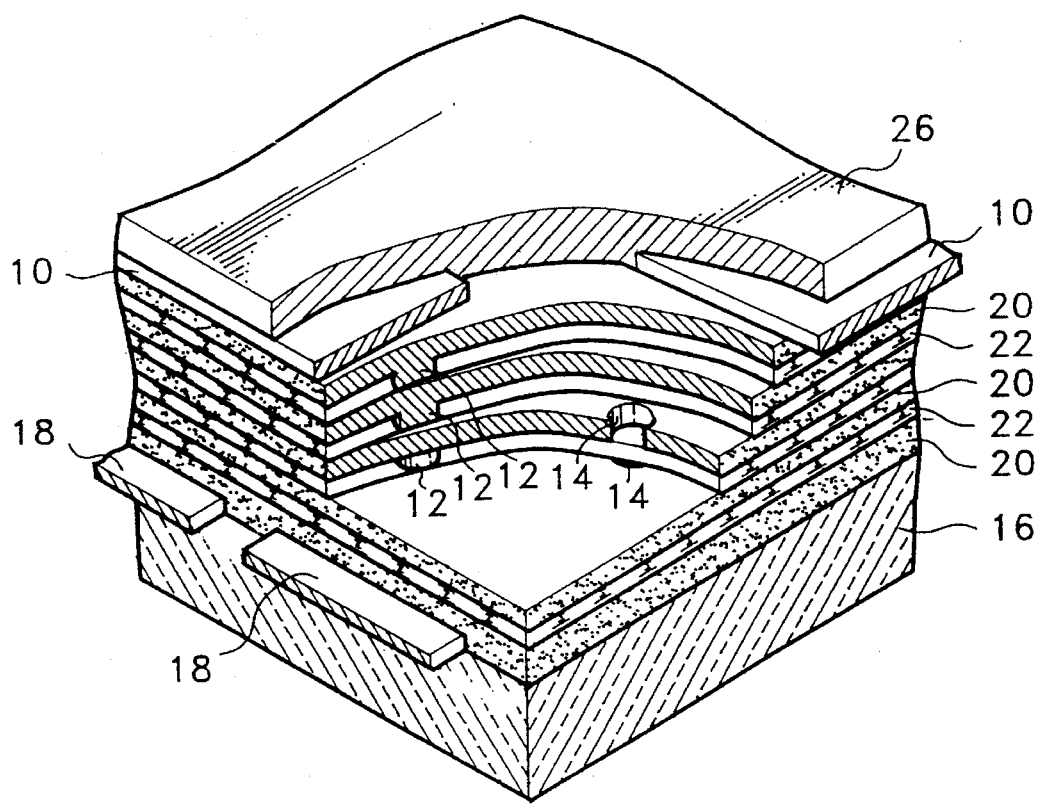
FIG. 1 is a schematically partly exploded perspective view of the LCD proposed according to the present Invention.
Figure 2:
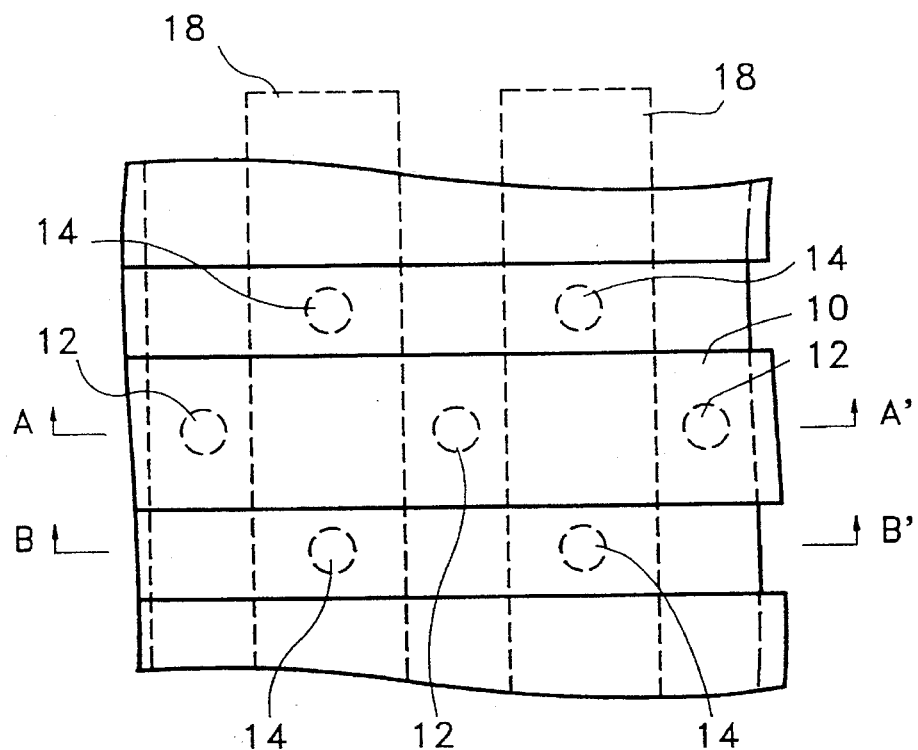
FIG. 2 is a partly extracted plan view of the LCD of FIG. 1.
Figure 3:
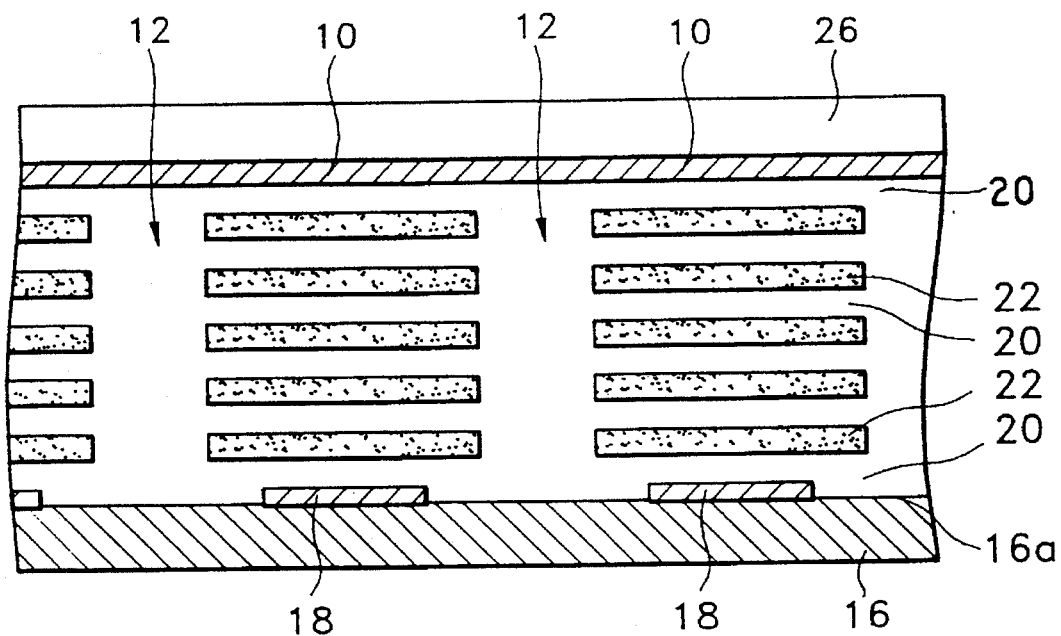
FIG. 3 is a cross-sectional view along a line A–A' of the LCD of FIG.2.
Figure 4:
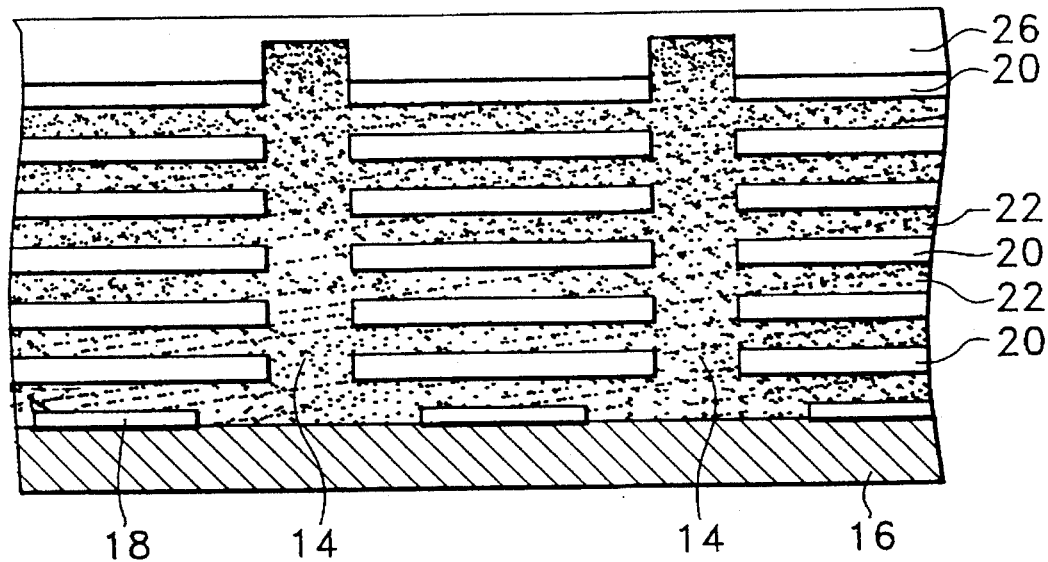
FIG. 4 is a cross-sectional view along a line B–B' of the reflective type LCD of FIG. 2.

The LCD manufactured by the method of the present invention, as shown in FIG. 1, comprises a multi-layer lamination of crystal layers 22 formed between a plurality of insulation layers 20. A glass substrate 16 without a polarized panel is disposed between these alternating layers.

In more detail, a field effect type crystal layer 22 is formed between each opposing electrode 10 and 18. The LCD 22 is partitioned by insulation layer 20. Insulation layers 20 are spaced apart by support columns 12. Insulation layers 20 also have inlet holes 14 for injection of liquid crystals. Each liquid crystal layer 22 is preferably less than 3 µm in thickness, and the thickness of the insulation layer should be less than 5 µm. Insulation layer 20 is made of a light-transmitting electrical insulation resins including epoxy resin, acryl resin, etc. Also, pneumatic liquid crystal, phase transition liquid crystal or strongly dielectric liquid crystal is preferably used for the field effect type liquid crystal. The overall thickness of the LCD should be 1 µm or thicker.

The manufacturing method for the LCD as constructed above, according to the present invention, will be described, hereinbelow.

Figure 5:
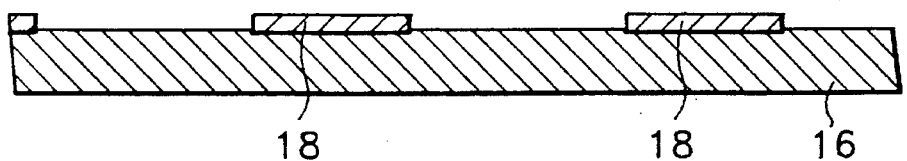
FIGS. 5–10 are views showing the manufacturing steps of the reflective type LCD of FIG. 1.
Figure 6:
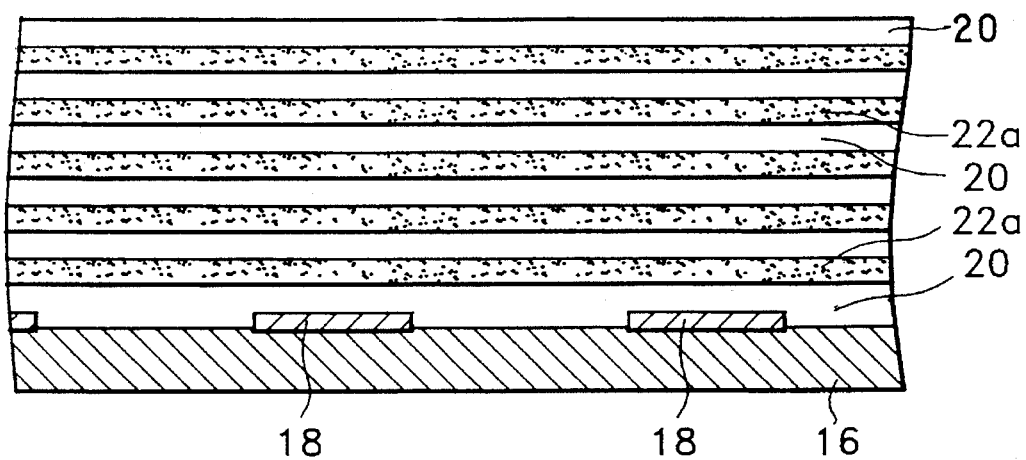

Referring to FIG. 5, electrode 18 is formed on the plastic substrate 16 by a predetermined pattern, using the conductive material such as indium tin oxide (ITO). Referring to FIG. 6, insulation layer 20 comprised of acryl resin and dissolution layer 22a comprised of PVA are repeatedly accumulated by spin coating method, roll coating method, etc., on the whole surface of the substrate and electrode of FIG. 5. Insulation layer 20 can be formed 2000 Å through 1 µm thick using epoxy resin, acryl resin or poly imide. The dissolution layer can be formed of PVA, PVB or arabic rubber. The arabic rubber should be dissolved to 0.1 through 10 wt % in the water, and the lamination should be formed preferably 1,000–8,000 Å thick. The preferable number of laminations is five through twenty.

Figure 7:
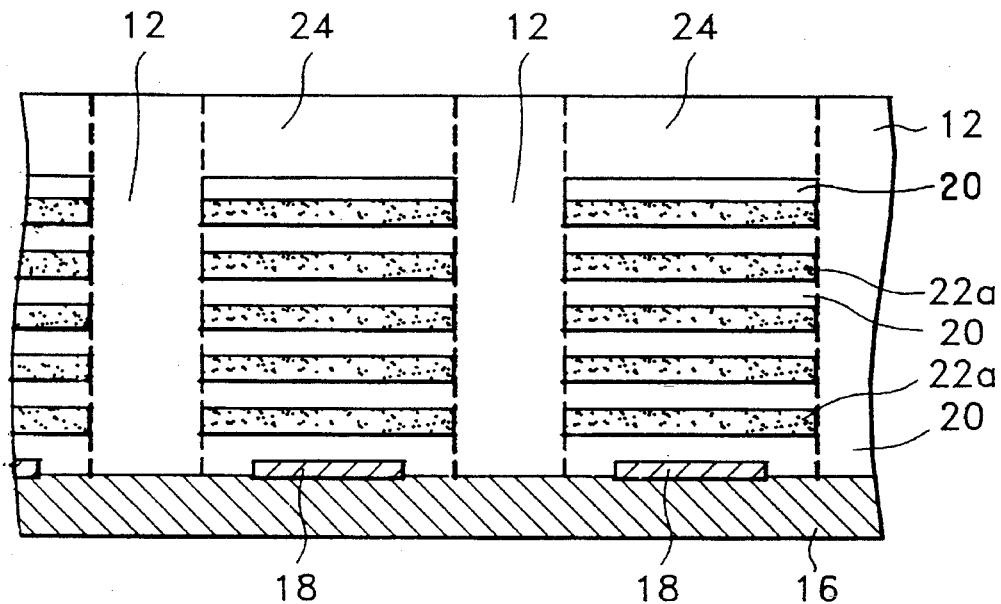

Referring to FIG. 7, a photo resist 24 is coated on the surface of the uppermost insulation layer 20, and then a photo mask pattern is utilized to form a photo resist pattern 24 for forming the columns on the periphery of light transmitting region 40. Then, the lamination structure is etched by a plasma or reactive ion etching method, to thereby form holes for the formation of columns 12. The holes are filled up with epoxy resin, to form columns 12.

Figure 8:
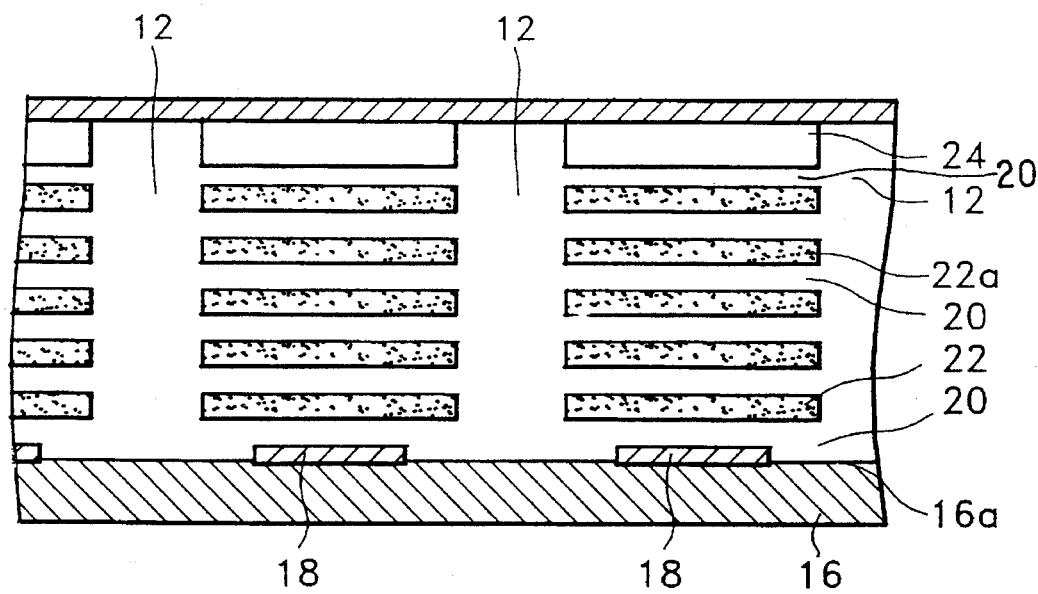

Referring to FIG. 8, light-transmitting material, for example, ITO, is coated on whole surface of the uppermost insulation layer to form second electrode 10 in stripe patterns. At this moment, though not illustrated in the drawing, electrode 10 is formed with a stripe shape vertical to electrode 18.

Figure 9:
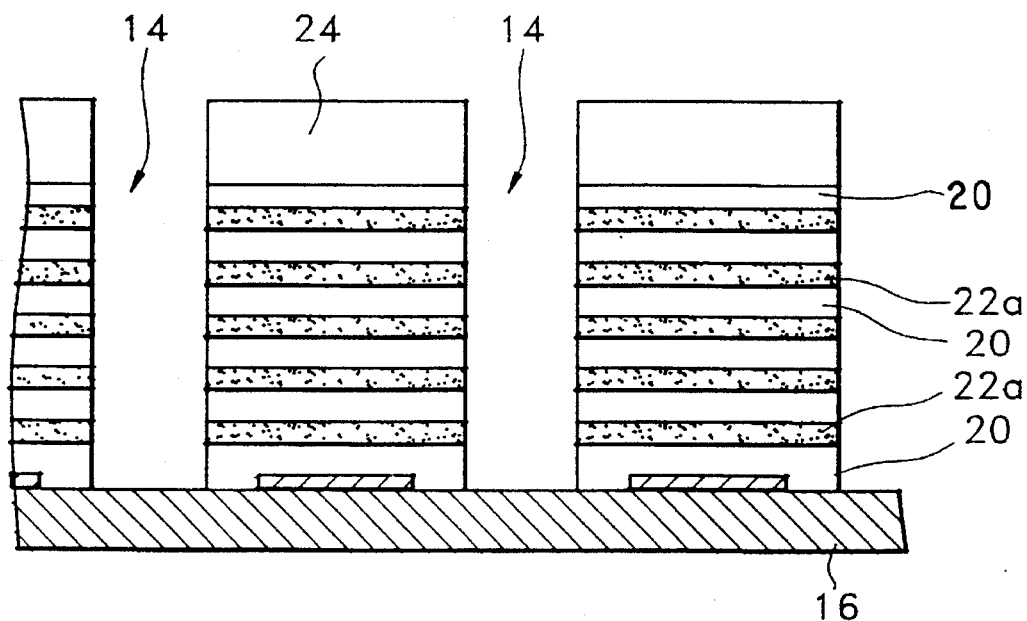

Referring to FIG. 9, inlet holes for the injection of liquid crystal are formed by photo mask pattern and plasma etching. The solvent is poured through inlet hole 14. For example, if the dissolution layer is comprised of PVA, water is injected as a solvent to dissolve and remove dissolution layer 22a, which thereby convert each dissolution layer 22a and inlet hole 14 to cavities. The epoxy resin layer 20 partitioning the cavities is supported by column 12.

Figure 10:
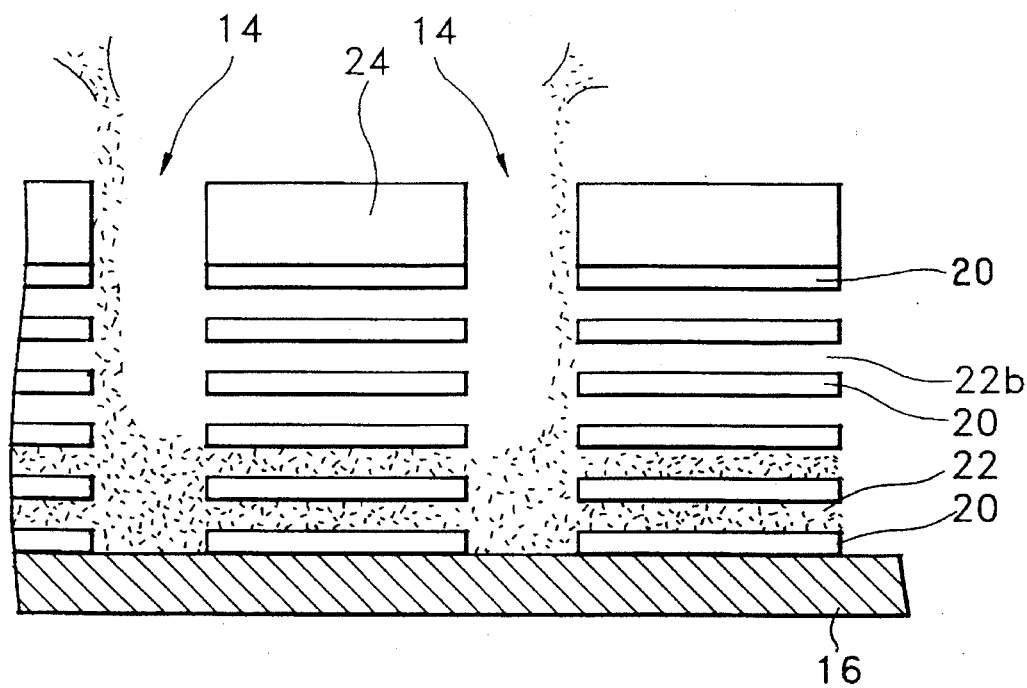

Referring to FIG. 10, after a drying step, liquid crystal is coated on the whole surface of the lamination structure in a vacuum. Next, with the gradual increase of the atmospheric pressure, liquid crystal layer 22 is formed in the cavities through inlet holes 14. Upon completion of the liquid crystal formation, acryl resin is coated on the whole surface of the lamination structure to seal off the lamination structure. Accordingly, a reflective type LCD is completed as shown in FIGS. 1 through 4.

The most difficult problem in the above-described manufacturing method is to completely remove the dissolution layer. For example, while the dissolution layer is formed as a metal layer as disclosed in one of the earlier filed Korean applications mentioned above, a strong etchant is needed for dissolving the metal layer. Thus, portions of the material that should not be etched are also etched away, thus reducing the effectiveness of the LCD.

Further, it is cumbersome to form columns and inlet holes for the injection of liquid crystal in different etching atmospheres, according to the etching condition.

However, in the manufacturing method according to the present invention, both the insulation layer and dissolution layer are formed of a polymer resin. Therefore, the use of strong etchant can be circumvented, and, more particularly, the etching step for forming the holes can be accomplished in the same atmosphere, which provides more convenience in the LCD manufacturing.

Moreover, when the arabic rubber is used, manufacturing process can be accomplished more easily and a very stable composition of LCD can be obtained. This is due to the advantageous physical characteristic of arabic rubber over PVA. Though both PVA and arabic rubber can be dissolved in water, PVA converts into an insoluble state in water of 150° C. or higher temperature, but arabic rubber shows favorable solubility even in water of about 180° C. Moreover, because PVA expands in volume when it is dissolved in water, the surrounding insulation layers below or above can be damaged. Because arabic rubber shows less expansion ratio, the problem can be circumvented.

The liquid crystal display device according to the present invention is thus designed to protect the layers from the attack of etchants, to thereby exhibit the stable characteristics. While the present invention has been particularly shown and described with reference to particular embodiments thereof, it will be understood by those skilled in the art that various changes in form and details may be effected therein without departing from the spirit and scope of the Invention as detained by the appended claims.

What is claimed is:

1. A method of manufacturing a multi-layer portion of a liquid crystal display device into which liquid crystal is deposited, said multi-layered portion formed over a substrate on which an electrode is disposed, comprising the steps of:

depositing a light transmitting electrically insulating layer made of a first polymer resin that is incapable of being dissolved by a selected solvent;

depositing a dissolution layer made of a second polymer resin that dissolves in said selected solvent;

repeating said insulating layer depositing step and said dissolution layer depositing step at least one additional time to obtain a layered structure containing a plurality of said insulating layers and said dissolution layers;

forming a support structure for said insulating layers; and removing said dissolution layers using said selected solvent to create a cavity into which said liquid crystal can be deposited.

2. A multi-layer portion manufacturing method according to claim 1, wherein said removing step uses water as said selected solvent.

3. A multi-layer portion manufacturing method according to claim 1, wherein said step of depositing said insulating layer selects said first polymer resin from the group consisting of epoxy resin, polyimide and acryl resin.

4. A multi-layer portion manufacturing method according to claim 1, wherein said step of depositing said dissolution layer selects said second polymer resin from the group consisting of poly vinyl acryl and poly vinyl butral.

5. A multi-layer portion manufacturing method according to claim 1, wherein said step of depositing uses arabic rubber as said second polymer resin.

6. A multi-layer portion manufacturing method according to claim 5, wherein said removing step uses water as said selected solvent.

7. A multi-layer portion manufacturing method according to claim 6, wherein said step of depositing uses arabic rubber dissolved at 0.1–10 wt % in water.

8. A multi-layer portion manufacturing method according to claim 5, wherein said step of depositing said dissolution layer deposits said arabic rubber to a thickness of substantially between 1,000 Å and 8,000 Å.

9. A multi-layer portion manufacturing method according to claim 1, wherein said step of depositing said insulating layer deposits said first polymer resin to a thickness of substantially between 2,000 Å and 1 μm.

10. A method of manufacturing a liquid crystal display device comprising the steps of:

forming a plurality of spaced first electrodes over a substrate;

depositing a light transmitting electrically insulating layer made of a first polymer resin that is incapable of being dissolved by a selected solvent;

depositing a dissolution layer made of a second polymer resin that dissolves in said selected solvent;

repeating said insulating layer depositing step and said dissolution layer depositing step at least one additional time to obtain a layered structure containing a plurality of said insulating layers and said dissolution layers;

forming a plurality of second electrodes over an uppermost insulating layer, each second electrode substantially aligned with one of said first electrodes;

forming a support structure for said oxidized layers;

removing said dissolution layers using said selected solvent to form empty spaces between said insulation layers;

filling said empty spaces with liquid crystal; and depositing a light-transmitting outer protective layer over said surface resulting from said liquid crystal and said second electrodes.

11. A multi-layer portion manufacturing method according to claim 10, wherein said removing step uses water as said selected solvent.

12. A multi-layer portion manufacturing method according to claim 10, wherein said step of depositing said insulating layer selects said first polymer resin from the group consisting of epoxy resin, poly imide and acryl resin.

13. A multi-layer portion manufacturing method according to claim 10, wherein said step of depositing said dissolution layer selects said second polymer resin from the group consisting of poly vinyl acryl and poly vinyl butral.

14. A multi-layer portion manufacturing method according to claim 10, wherein said step of depositing uses arabic rubber as said second polymer resin.

15. A multi-layer portion manufacturing method according to claim 14, wherein said removing step uses water as said selected solvent.

16. A multi-layer portion manufacturing method according to claim 15, wherein said step of depositing uses arabic rubber dissolved at 0.1–10 wt % in water.

17. A multi-layer portion manufacturing method according to claim 14, wherein said step of depositing said dissolution layer deposits said arabic rubber to a thickness of substantially between 1,000 Å and 8,000 Å.

18. A multi-layer portion manufacturing method according to claim 10, wherein said step of depositing said insulating layer deposits said first polymer resin to a thickness of substantially between 2,000 Å and 1 µm.

* * * * *